(12) United States Patent
Senou

(10) Patent No.: US 10,138,975 B2
(45) Date of Patent: Nov. 27, 2018

(54) PRESSURE BUFFER DEVICE AND FLOW PATH FORMING MEMBER

(71) Applicant: Showa Corporation, Gyoda-shi (JP)

(72) Inventor: Naoki Senou, Gyoda (JP)

(73) Assignee: SHOWA CORPORATION, Gyoda-Shi (JP)

(*) Notice: Subject to any disclaimer, the term of this patent is extended or adjusted under 35 U.S.C. 154(b) by 0 days.

(21) Appl. No.: 15/405,445

(22) Filed: Jan. 13, 2017

(65) Prior Publication Data

US 2017/0248188 A1    Aug. 31, 2017

(30) Foreign Application Priority Data

Feb. 25, 2016   (JP) .................................. 2016-034350

(51) Int. Cl.
| | | |
|---|---|---|
| *F16F 9/34* | (2006.01) | |
| *F16F 9/348* | (2006.01) | |
| *F16F 9/32* | (2006.01) | |

(52) U.S. Cl.
CPC .......... *F16F 9/3482* (2013.01); *F16F 9/3214* (2013.01)

(58) Field of Classification Search
CPC ........ F16F 9/3214; F16F 9/0227; F16F 9/368; F16F 2230/02; F16F 9/3482; F16F 9/3485; F16J 1/09; F16J 1/001
USPC ............................ 188/322.15; 92/181 P, 184
See application file for complete search history.

(56) References Cited

U.S. PATENT DOCUMENTS

| | | | | |
|---|---|---|---|---|
| 3,730,305 A | * | 5/1973 | Fouts .................... | F16F 9/3214 188/322.15 |
| 5,404,973 A | * | 4/1995 | Katoh .................... | F16F 9/468 188/266.3 |
| 6,371,264 B1 | * | 4/2002 | Deferme ............... | F16F 9/3485 188/282.6 |
| 6,886,670 B2 | * | 5/2005 | Holiviers .............. | F16F 9/3214 188/322.14 |

(Continued)

FOREIGN PATENT DOCUMENTS

| | | |
|---|---|---|
| CN | 105102848 A | 11/2015 |
| DE | 102004050732 A1 * | 6/2005 |

(Continued)

OTHER PUBLICATIONS

Extended European Search Report dated Jul. 17, 2017 for the corresponding European Patent Application No. 17152557.9.

(Continued)

*Primary Examiner* — Pamela Rodriguez
(74) *Attorney, Agent, or Firm* — Leason Ellis LLP

(57) ABSTRACT

One embodiment provides a pressure buffer device including: a cylinder that stores fluid; a flow path forming portion that forms a flow path; and an opening-closing portion that opens and closes the flow path of the flow path forming portion. The fluid flows through the flow path forming portion in accordance with relative movement of a rod with respect to the cylinder in an axial direction of the cylinder. The flow path forming portion includes an annular first protruded portion and an annular second protruded portion protruded in the axial direction in opposite sides respectively. The second protruded portion has an axial end located at a radially outer side of the first protruded portion, and a tilt portion formed at least at a part of a radially-inner part of the second protruded portion.

11 Claims, 9 Drawing Sheets

(56) References Cited

U.S. PATENT DOCUMENTS

| | | | |
|---|---|---|---|
| 9,772,000 B2 * | 9/2017 | Fukushima | F16F 9/368 |
| 2005/0067241 A1 | 3/2005 | Holiviers et al. | |
| 2006/0118372 A1 * | 6/2006 | Hammer | F16F 9/34 |
| | | | 188/284 |
| 2009/0260938 A1 * | 10/2009 | Hikosaka | F16F 9/3484 |
| | | | 188/322.15 |
| 2015/0211634 A1 * | 7/2015 | Kobayashi | F16J 1/04 |
| | | | 92/172 |
| 2015/0345584 A1 | 12/2015 | Fukushima | |
| 2016/0017950 A1 | 1/2016 | Nakano et al. | |
| 2017/0016506 A1 | 1/2017 | Senou et al. | |

FOREIGN PATENT DOCUMENTS

| | | |
|---|---|---|
| DE | 102010040458 A | 3/2012 |
| JP | 2014-152812 A | 8/2014 |
| WO | WO-97/11289 A1 * | 3/1997 |
| WO | WO-2014/077265 A | 5/2014 |
| WO | WO-2015/177880 A | 11/2015 |

OTHER PUBLICATIONS

Office Action dated Aug. 2, 2018 for the corresponding Chinese Patent Application No. 201710058372.3.

\* cited by examiner

PRESSURE BUFFER DEVICE AND FLOW PATH FORMING MEMBER

CROSS-REFERENCE TO RELATED APPLICATION(S)

This application claims priority from Japanese Patent Application No. 2016-034350 filed on Feb. 25, 2016, the entire contents of which are incorporated herein by reference.

BACKGROUND

1. Field of the Invention

The present invention relates to a pressure buffer device and a flow path forming member.

2. Description of Related Art

A pressure buffer device includes a flow path forming portion (flow path forming member) in which a flow path for flowing fluid in accordance with relative movement of a rod to a cylinder.

For example, JP-2014-152812-A discloses a technology of a piston in which a disc-shaped leaf valves are layered on one side, the piston including a seating face arranged on the one side for making the disc-shaped leaf valves seat thereon and a leg portion vertically arranged at an outer circumference on the other side along the circumferential direction. Here, a supporting portion is arranged at an outer circumference of the seating face along the circumferential direction and a hollow is formed at an inner circumference side at an end of the leg portion, so that the leg portion is contacted to the supporting portion without being contacted to the seating face when the pistons are stacked in the axial direction.

When manufacturing flow path forming portions (flow path forming members), a plurality of flow path forming portions may be stacked. Here, there is a possibility that wear occurs at the flow path forming portions due to contact between the flow path forming portions. Some sections of the flow path forming portions are particularly required not be worn. Therefore, for example, if flow path forming portions can be stacked while suppressing wear at such sections, manufacturing thereof can be facilitated.

Further, it is preferable that flow path forming portions have a shape to be easily manufactured, for example, with use of molding.

SUMMARY

A pressure buffer device according to an aspect of the present invention includes a cylinder that stores fluid, a flow path forming portion that forms a flow path through which the fluid flows in accordance with relative movement of a rod with respect to the cylinder in an axial direction of the cylinder, and an opening-closing portion that opens and closes the flow path of the flow path forming portion. Here, the flow path forming portion includes a first protruded portion that is formed annularly to be protruded in the axial direction, to which the opening-closing portion is contacted, and a second protruded portion that is protruded in the axial direction toward a side opposite to the first protruded portion, that has an end in the axial direction located at a radially outer side of the first protruded portion, and that includes a tilt portion tilted with respect to the axial direction and formed at least at a part of a radially-inner part of the second protruded portion.

According to the aspect of the present invention, manufacturing of a flow path forming portion in a pressure buffer device is facilitated.

DETAILED DESCRIPTION

In the following, embodiments will be described with reference to the attached drawings.

Figure 1:
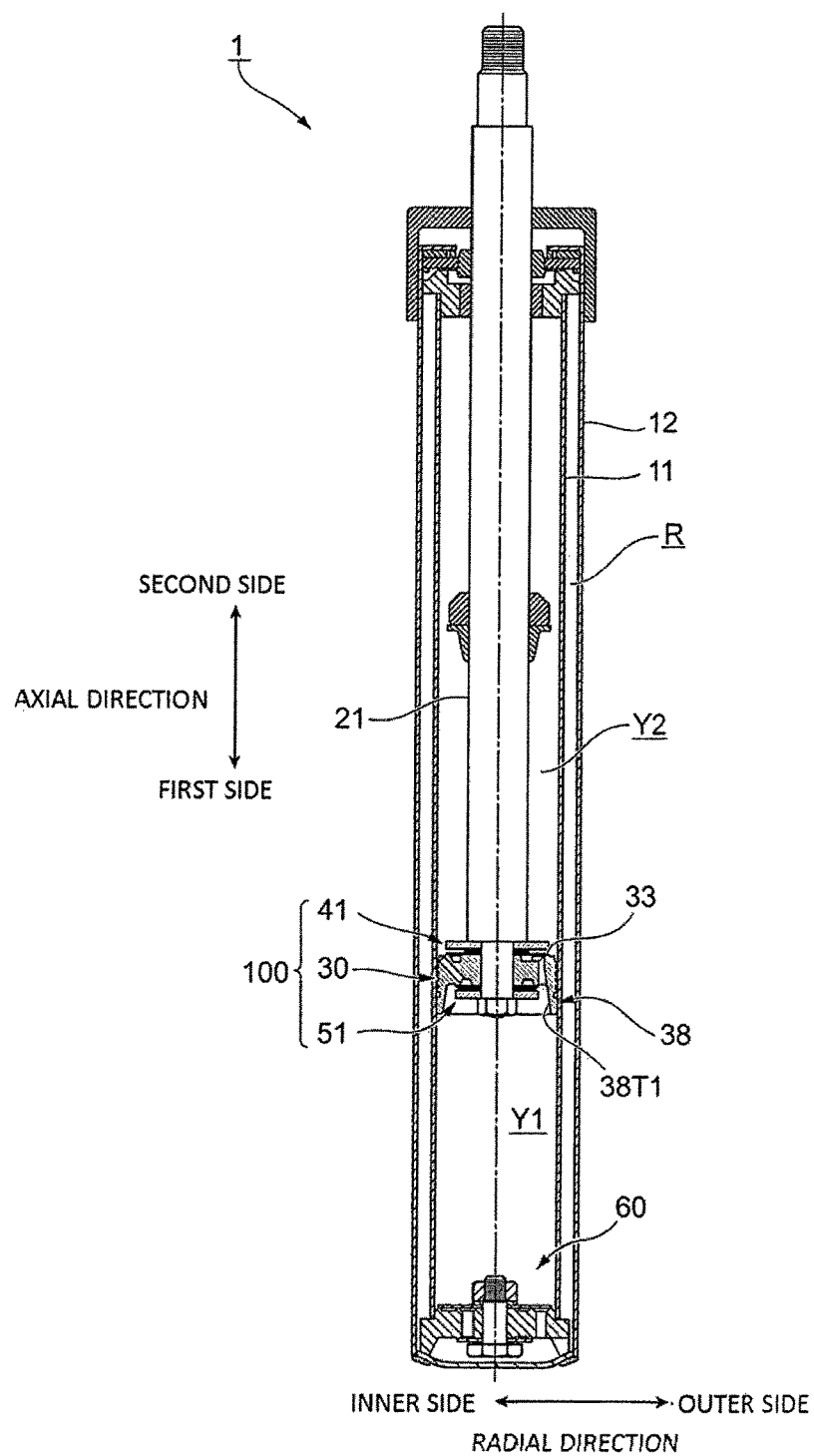
FIG. 1 is a whole structural view of a hydraulic buffer device 1 of a first embodiment.

FIG. 1 is a whole structural view of a hydraulic buffer device 1 of a first embodiment. In the following description, the longitudinal direction of the hydraulic buffer device 1 is referred to as "an axial direction". In the axial direction, the lower side and the upper side of the hydraulic buffer device 1 are referred to as "a first side" and "a second side", respectively. Further, the lateral direction of the hydraulic buffer device 1 is referred to as "a radial direction". In the radial direction, a side toward the center axis and a side being apart from the center axis are referred to as "a radially inner side" and "a radially outer side", respectively.

First, a configuration of the hydraulic buffer device 1 (an example of a pressure buffer device) will be described.

The hydraulic buffer device 1 includes a first cylinder 11 (an example of a cylinder) that stores oil (an example of fluid), and a second cylinder 12 that is arranged at the radially outer side of the first cylinder 11. The hydraulic buffer device 1 includes a piston rod 21 (an example of a rod) capable of moving in the axial direction, a piston portion 100 that moves in the first cylinder as being arranged on the first side of the piston rod 21, and a bottom valve portion 60 arranged on the first side of the first cylinder 11.

The piston portion 100 includes a piston body 30 (an example of a flow path forming portion) in which a compression-side oil path 311 (an example of a flow path) is formed to flow oil therethrough in accordance with relative movement of the piston rod 21 in the axial direction of the first cylinder 11, and a compression-side damping valve 41 (an example of an opening-closing portion) that opens and closes the compression-side oil path 311. The piston body 30 includes a first outer round portion 33 (an example of a first protruded portion) that is formed annularly as being protruded in the axial direction, to which the compression-side damping valve 41 is contacted, and an annular protruded portion 38 (an example of a second protruded portion) that is protruded in the axial direction toward the side opposite to the first outer round portion 33 having an end of the annular protruded portion 38 in the axial direction be located at the radially outer side of the first outer round portion 33 while a first inner tilt portion 38T1 (an example of a tilt portion) tilted to the axial direction is formed at least at a part of the annular protruded portion 38 at the radially inner side.

In the following, configurations of the above will be described in detail.

The first cylinder 11 is formed into a cylindrical shape. The second cylinder 12 is formed into a cylindrical shape as being coaxial with the first cylinder 11. A reservoir chamber R being a cylindrical space is formed between the first cylinder 11 and the second cylinder 12. Oil is stored in the reservoir chamber R while gas is charged in the reservoir chamber R on the second side.

Regarding the piston rod 21, a part on the first side is located at the inside of the first cylinder 11 and the remaining part on the second side is exposed to the outside of the first cylinder 11. The piston portion 100 is arranged at the end of the piston rod 21 on the first side.

The piston portion 100 is moved in the axial direction in accordance with movement of the piston rod 21. The piston portion 100 includes the piston body 30 having a plurality of oil paths that penetrates in the axial direction, the compression-side damping valve 41 arranged on the second side of the piston body 30, and an extension-side damping valve 51 arranged on the first side of the piston body 30.

The piston portion 100 partitions a space in the first cylinder 11 into a first oil chamber Y1 being a space on the first side in the axial direction and a second oil chamber Y2 being a space on the other side in the axial direction.

The bottom valve portion 60 performs partitioning of the reservoir chamber R and the first oil chamber Y1 as being arranged at the end of the hydraulic buffer device 1 on the first side. The bottom valve portion 60 controls oil flow between the reservoir chamber R and the first oil chamber Y1 in accordance with movement of the piston portion 100.

Next, description will be provided on the piston body 30.

Figure 2A:
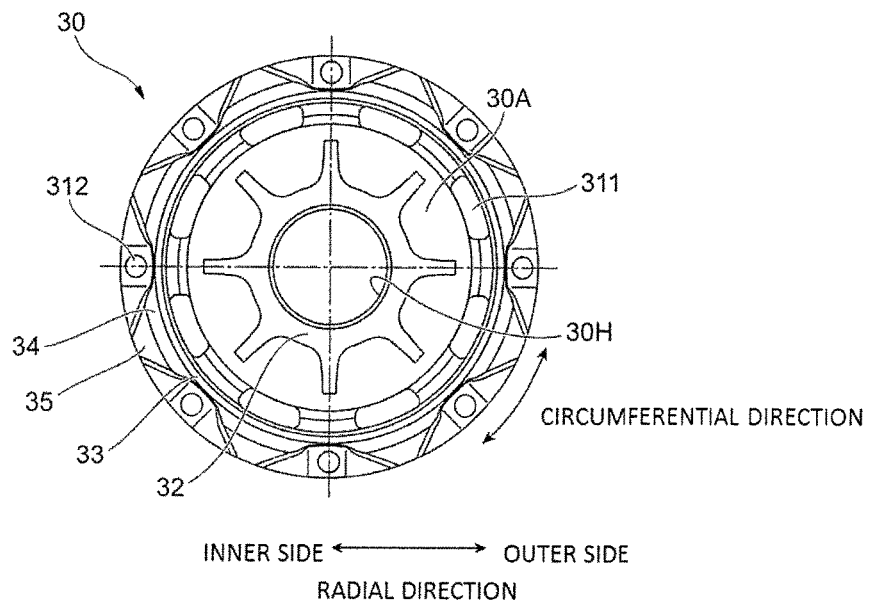
FIG. 2A is a top view and FIG. 2B is a bottom view of a piston body of the present embodiment.
Figure 2B:
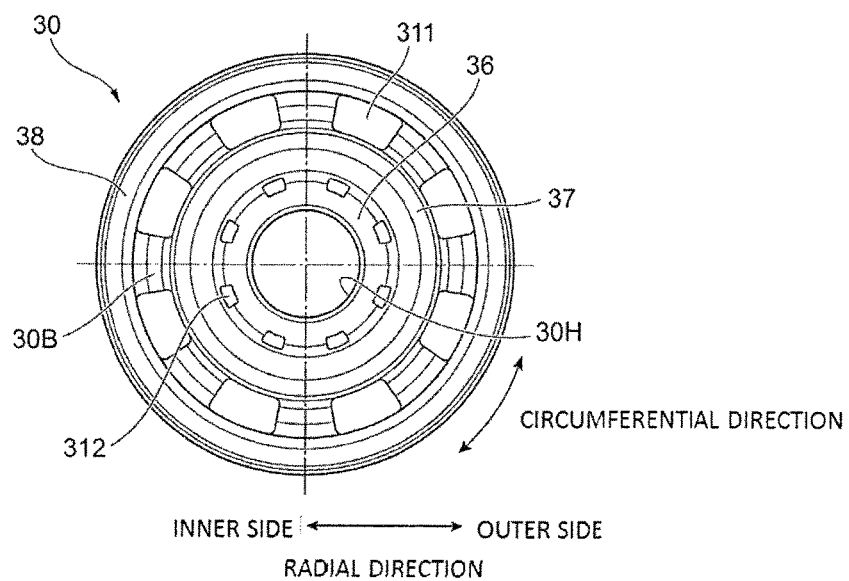
Figure 3:
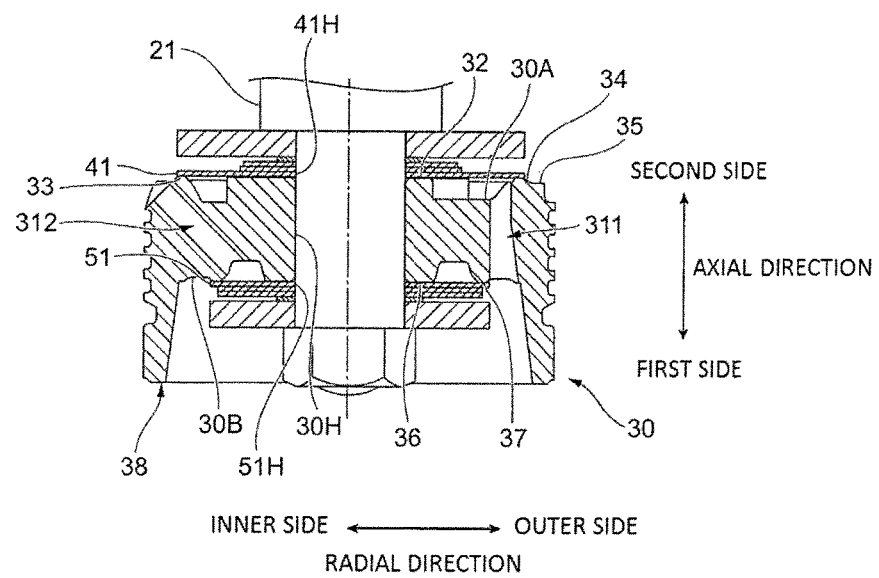
FIG. 3 is a sectional view of the piston body of the present embodiment.
Figure 4:
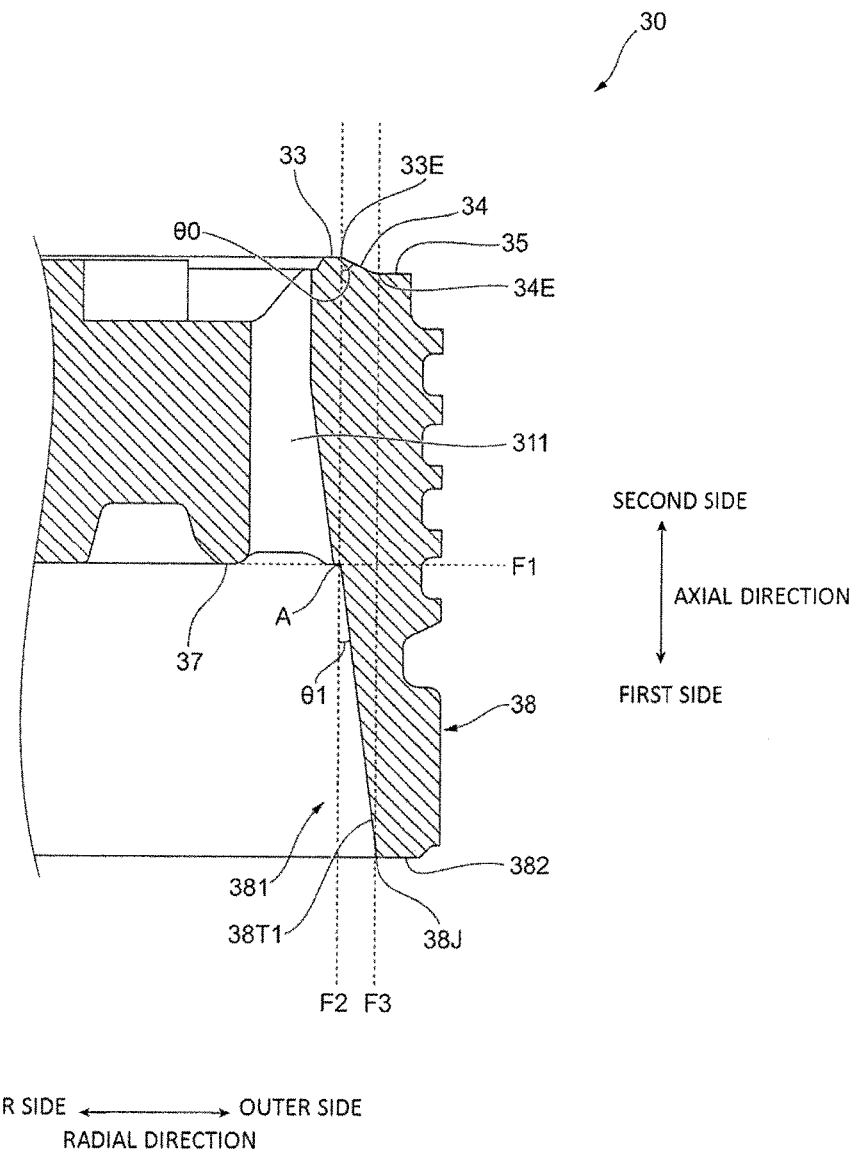
FIG. 4 is a partial sectional view of the piston body of the present embodiment.

FIG. 2A is a top view of the piston body 30 viewing from the second side and FIG. 2B is a bottom view thereof viewing from the first side. FIG. 3 is a sectional view of the piston body 30. In FIG. 3, the piston rod 21, the compression-side damping valve 41, and the extension-side damping valve 51 are illustrated as well. FIG. 4 is a partial sectional view of the piston body 30.

[Configuration of Piston Body 30]

The piston body 30 includes a through-hole 30H formed at the radially inner side, compression-side oil paths 311 formed at the radially outer side of the through-hole 30H, and extension-side oil paths 312 formed at the radially outer side of the through-hole 30H. The piston body 30 includes, on the second side, a first inner round portion 32, a first outer round portion 33, a first tilt portion 34, and an outer end part 35.

Further, the piston body 30 includes, on the first side, a second inner round portion 36, a second outer round portion 37, and an annular protruded portion 38.

In the present embodiment, the piston body 30 is formed, for example, by filling metal powder into a mold and sintering the filled metal powder.

The through-how 30H is formed in the axial direction of the piston body 30. The piston rod 21 is inserted to the through-hole 30H.

The compression-side oil paths 311 enable oil to flow between the first oil chamber Y1 and the second oil chamber Y2 in a compression stroke of the hydraulic buffer device 1. The compression-side oil paths 311 are arranged at a plurality of positions (eight positions in the present embodiment) at approximately even intervals in the circumferential direction.

The extension-side oil paths 312 enable oil to flow between the second oil chamber Y2 and the first oil chamber Y1 in an extension stroke of the hydraulic buffer device 1. The extension-side oil paths 312 are arranged at a plurality of positions (eight positions in the present embodiment) at approximately even intervals in the circumferential direction.

The first inner round portion 32 is formed approximately into an annular shape at the outer circumference of the through-hole 30H. The first inner round portion 32 is protruded toward the second side in the axial direction from a first end face 30A formed on the second side. The first inner round portion 32 is in contact with the compression-side damping valve 41 at the radially inner side.

The first outer round portion 33 is formed approximately into an annular shape at the radially outer side of the compression-side oil paths 311. The first outer round portion 33 is protruded toward the second side in the axial direction from the first end face 30A. Here, protrusion height of the first outer round portion 33 is slightly higher than that of the first inner round portion 32.

The first outer round portion 33 is formed along a face that is approximately perpendicular to the axial direction. The first outer round portion 33 is most protruded on the second side of the piston body 30. The first outer round portion 33 is in contact with the compression-side damping valve 41 at the radially outer side. Here, an end part of the first outer round portion 33 at the radially outer side is called a round end part 33E.

The first tilt portion 34 is arranged as a face tilted to the axial direction as being connected to the first outer round portion 33 and the outer end part 35. The outer end part 35 is arranged as a face that is approximately perpendicular to the axial direction at the radially outer side of the first tilt portion 34.

The second inner round portion 36 is formed approximately into an annular shape at the outer circumference of the through-hole 30H. The second inner round portion 36 is protruded toward the first side in the axial direction from a second end face 30B formed on the first side. The second inner round portion 36 is in contact with the extension-side damping valve 51 at the radially inner side.

The second outer round portion 37 is formed approximately into an annular shape. The second outer round portion 37 is formed on the first side at the radially outer side of the extension-side oil paths 312 and at the radially inner side of the compression-side oil paths 311. The second outer round portion 37 is protruded toward the first side in the axial direction from the second end face 30B. Here, protrusion height of the second outer round portion 37 is slightly higher than that of the second inner round portion 36. The second outer round portion 37 is protruded toward the extension-side damping valve 51 to form a part being in contact with the extension-side damping valve 51 at the radially outer side.

Next, detailed description will be provided on the annular protruded portion 38.

Here, a straight line passing through the second outer round portion 37 as being perpendicular to the axial direction is called a first imaginary line F1. A straight line passing through the round end part 33E of the first outer round portion 33 as being parallel to the axial direction of the piston body 30 is called a second imaginary line F2. A point where the first imaginary line F1 and the second imaginary line F2 intersect is called an intersection point A. A line passing through a tilt end part 34E of the first tilt portion 34 as being parallel to the axial direction of the piston body 30 is called a third imaginary line F3.

The annular protruded portion 38 is formed approximately into an annular shape as being arranged at the piston body 30 at the radially outer side. The annular protruded portion 38 is protruded largely more than the second outer round portion 37 in the axial direction. That is, the annular protruded portion 38 is protruded toward the first side from the first imaginary line F1. The annular protruded portion 38 includes an inner circumferential portion 381 arranged at the radially inner side and an end part 382 arranged on the first side.

The inner circumferential portion 381 includes the first inner tilt portion 38T1 that is formed as a face tilted to the axial direction. An angle θ1 between the first inner tilt portion 38T1 and the axial direction is smaller than an angle θ0 between the first tilt portion 34 and the axial direction. The inner diameter of the first inner tilt portion 38T1 is increased from the second side toward the first side.

The first inner tilt portion 38T1 is formed from the intersection point A to the end part 382. That is, at the radially inner side, the annular protruded portion 38 is formed only by the first inner tilt portion 38T1. The first inner tile portion 38T1 is arranged at the radially outer side of the first outer round portion 33.

The end part 382 is formed as a face that is perpendicular to the axial direction as being connected to the inner circumferential portion 381 at the radially inner side. A connection portion between the inner circumferential portion 381 and the end part 382 (i.e., a connection position between the first inner tilt portion 38T1 and the end part 382) is called a connection portion 38J.

Next, description will be provided on positional relation between the first outer round portion 33 and the annular protruded portion 38.

The connection portion 38J is located at the radially outer side of the second imaginary line F2. That is, the end part 382 is arranged at the radially outer side of the first round portion 33. Further, the connection portion 38J is located at the radially outer side of the third imaginary line F3. That is, the end part 382 is arranged at the radially outer side of the first tilt portion 34.

[Configuration of Compression-Side Damping Valve 41 and Extension-Side Damping Valve 51]

As illustrated in FIG. 3, the compression-side damping valve 41 is, for example, a metal-made disc-shaped plate. The compression-side damping valve 41 has an opening 41H, at the radially inner side, through which the piston rod 21 passes. The compression-side damping valve 41 is formed to have a larger diameter than the first outer round portion 33. The compression-side damping valve 41 covers the second side of the compression-side oil path 311 and continuously opens the second side of the extension-side oil path 312.

The extension-side damping valve 51 is, for example, a metal-made disc-shaped plate. The extension-side damping valve 51 has an opening 51H, at the radially inner side, through which the piston rod 21 passes. The extension-side damping valve 51 is formed to have a larger diameter than the second outer round portion 37. The extension-side damping valve 51 closes the first side of the extension-side oil path 312 and continuously opens the first side of the compression-side oil path 311.

The hydraulic buffer device 1 of the present embodiment structured as described above operates as follows.

For example, when the piston rod 21 is moved toward the first side with respect to the first cylinder 11, the piston portion 100 is moved toward the first side as compressing oil in the first oil chamber Y1. Oil in the first oil chamber Y1 flows through the compression-side oil path 311 as opening the compression-side damping valve 41 and flows into the second oil chamber Y2.

In contrast, when the piston rod 21 is moved toward the second side with respect to the first cylinder 11, the piston portion 100 is moved toward the second side as compressing oil in the second oil chamber Y2. Oil in the second oil chamber Y2 flows through the extension-side oil path 312 as opening the extension-side damping valve 51 and flows into the first oil chamber Y1.

Thus, the hydraulic buffer device 1 generates damping force in accordance with movement of the piston portion 100.

Next, description will be provided on a case that a plurality of the piston bodies 30 are stacked so that positions thereof match in the radial direction, for example, during manufacturing.

Figure 5A:
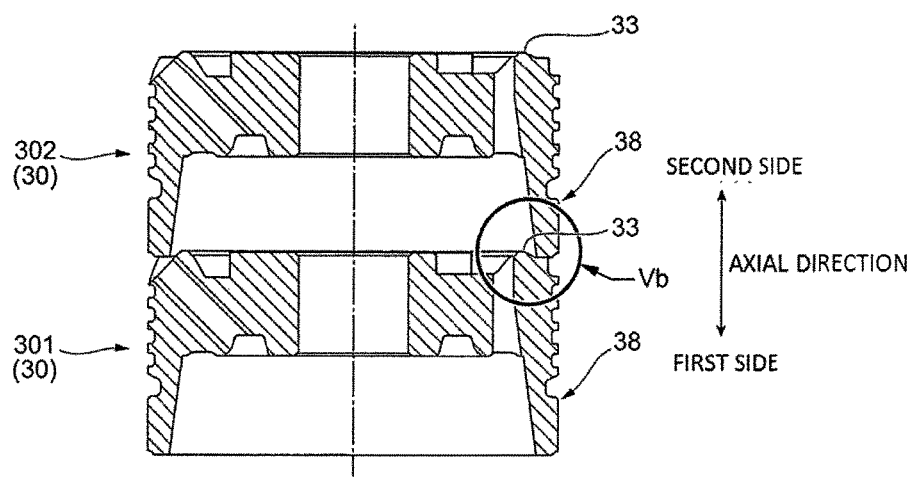
FIGS. 5A and 5B are views illustrating a state that a plurality of the piston bodies are stacked.
Figure 5B:
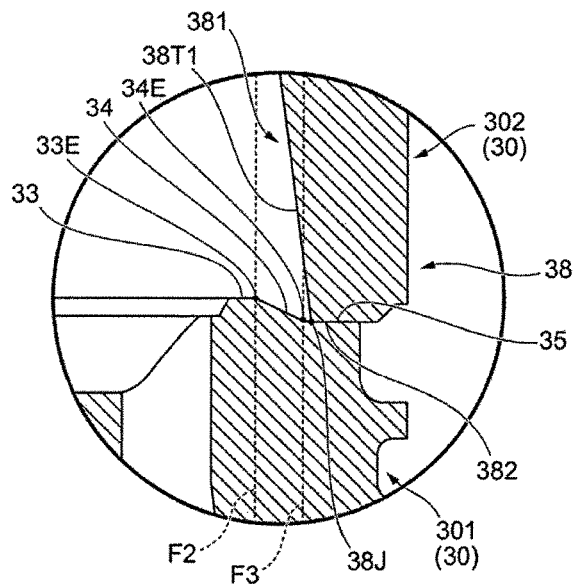

FIGS. 5A and 5B are views illustrating a state that the piston bodies 30 are stacked. FIG. 5A is a sectional view of the stacked piston bodies 30 and FIG. 5B is an enlarged view of a region Vb illustrated in FIG. 5A.

Here, the piston body 30 placed on the first side is called a first-side piston body 301 and the piston body 30 placed on the second side is called a second-side piston body 302.

The end part 382 of the annular protruded portion 38 of the second-side piston body 302 faces to the outer end part 35 of the first-side piston body 301.

The connection portion 38J of the second-side piston body 302 is arranged at the radially inner side of the second imaginary line F2. Accordingly, the annular protruded portion 38 of the second-side piston body 302 is not contacted to the first outer round portion 33 of the first-side piston body 301. The first outer round portion 33 to which the compression-side damping valve 41 is contacted exerts a potent influence on damper force characteristics. In the present embodiment, contact of the annular protruded portion 38 with the first outer round portion 33 is suppressed.

Further, the connection portion 38J of the second-side piston body 302 is arranged at the radially outer side of the third imaginary line F3. Accordingly, the annular protruded portion 38 of the second-side piston body 302 is not contacted as well to the first tilt portion 34 of the first-side piston body 301.

Thus, in the present embodiment, wear of the piston body 30 is suppressed even when the piston bodies 30 are stacked.

In the piston body 30 of the present embodiment, the first inner tilt portion 38T1 is arranged, for example, at the annular protruded portion 38. Accordingly, when the piston body 30 is formed by molding for example, a mold body as the piston body 30 is easily ejected from the mold. Thus, the piston body 30 of the present embodiment is formed into a shape to be easily manufactured.

Further, in the piston body 30 of the present embodiment, since the inner circumferential portion 381 of the annular protruded portion 38 is formed into a tilt shape, stress can be relieved to provide advantage in strength, for example, compared to a stepped shape.

First Modified Example

Figure 6:
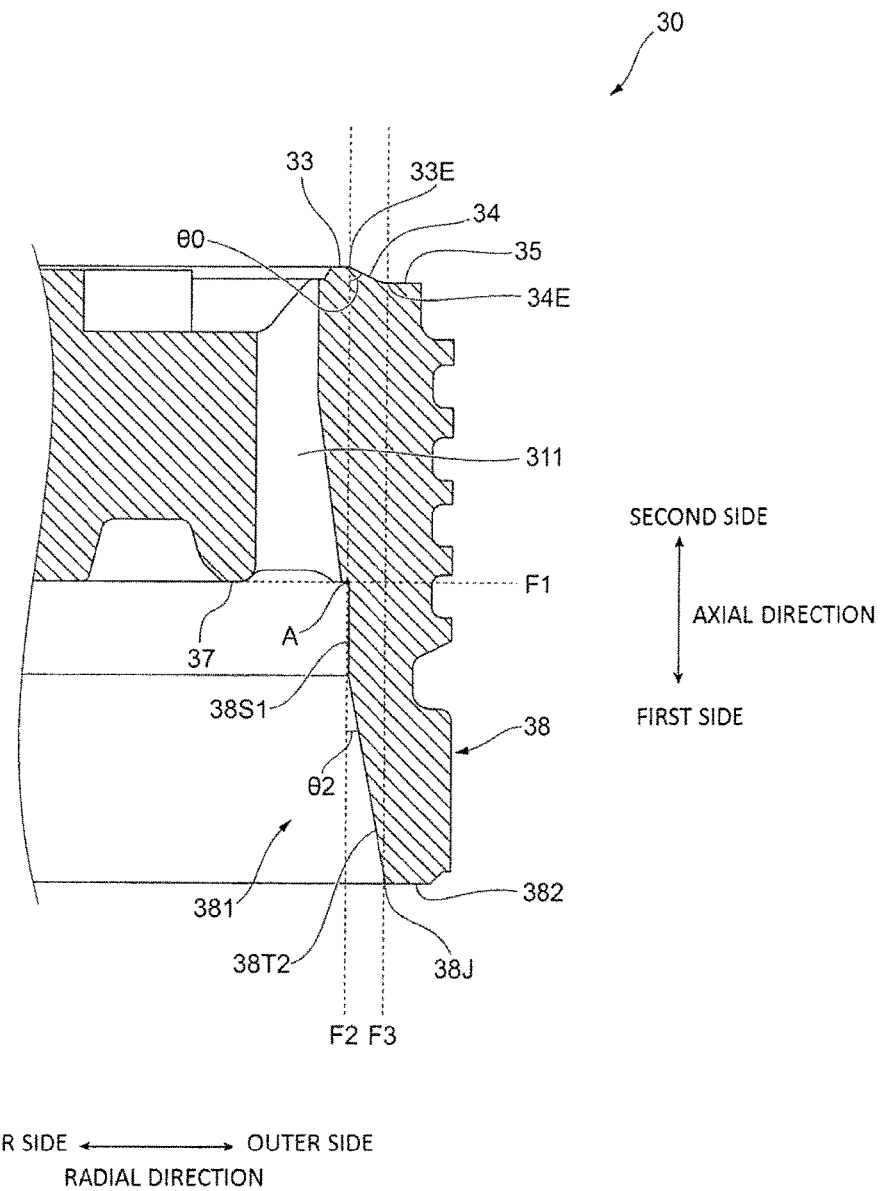
FIG. 6 is a partial sectional view of a piston body of a first modified example.

FIG. 6 is a partial sectional view of the piston body 30 of a first modified example.

In the piston body 30 of the first modified example, the inner circumferential portion 381 has a different shape from that in the abovementioned embodiment. In the following, detailed description will be provided on the shape of the inner circumferential portion 381 of the first modified example.

The inner circumferential portion 381 includes a first linear portion 38S1 and a second inner tilt portion 38T2. The first linear portion 38S1 is formed approximately in a straight line shape along the axial direction. A second side end of the first linear portion 38S1 is located at the intersection point A and a first side end thereof is located at a position being closer to the intersection point A than the center of the annular protruded portion 38 in the axial direction. Further, the first linear portion 38S1 is shorter than the second inner tilt portion 38T2.

The second inner tilt portion 38T2 is formed as a face tilted to the axial direction. An angle θ2 between the second inner tilt portion 38T2 and the axial direction is smaller than the angle θ0 between the first tilt portion 34 and the axial direction. The inner diameter of the second inner tilt portion 38T2 is increased from the second side toward the first side.

Further, the second inner tilt portion 38T2 (an example of the tilt portion) is arranged at the radially outer side of the first outer round portion 33 (an example of the first protruded portion).

Next, description will be provided on positional relation between the first outer round portion 33 and the annular protruded portion 38 in the first modified example.

The first linear portion 38S1 is formed along the second imaginary line F2. Accordingly, the first linear portion 38S1 is arranged at the radially outer side of the first outer round portion 33. The connection portion 38J (a connection position between the second inner tilt portion 38T2 and the end part 382 in the first modified example) is formed at the radially outer side of the second imaginary line F2. That is, the end part 382 is arranged at the radially outer side of the first outer round portion 33. Further, the connection portion 38J is formed at the radially outer side of the third imaginary line F3. That is, the end part 382 is arranged at the radially outer side of the first tilt portion 34.

Accordingly, in the first modified example, wear of the piston body 30 is suppressed even when the piston bodies 30 are stacked.

Further, owing to that the second inner tilt portion 38T2 is arranged, the piston body 30 of the first modified example is formed into a shape to be easily manufactured.

Second Modified Example

Figure 7:
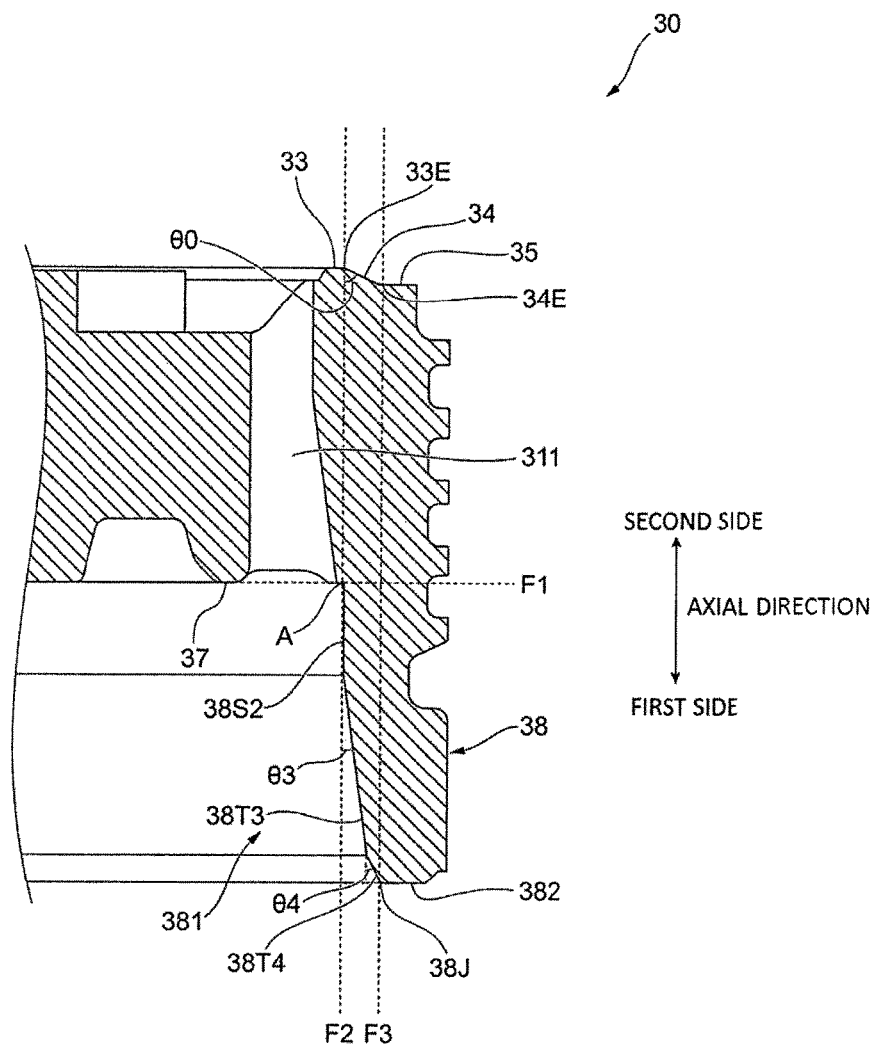
FIG. 7 is a partial sectional view of a piston body of a second modified example.

FIG. 7 is a partial sectional view of the piston body 30 of a second modified example.

In the piston body 30 of the second modified example, the inner circumferential portion 381 has a different shape from that in the abovementioned embodiment. In the following, detailed description will be provided on the shape of the inner circumferential portion 381 of the second modified example.

The inner circumferential portion 381 includes a second linear portion 38S2, a third inner tilt portion 38T3 (an example of the first tilt portion), and a fourth inner tilt portion 38T4 (an example of the second tilt portion). The second linear portion 38S2 is formed approximately in a straight line shape along the axial direction. A second side end of the second linear portion 38S2 is located at the intersection point A and a first side end thereof is located at a position being closer to the intersection point A than the center of the annular protruded portion 38 in the axial direction. Further, the second linear portion 38S2 is shorter than the third inner tilt portion 38T3.

The third inner tilt portion 38T3 is formed as a face tilted to the axial direction. An angle θ3 between the third inner tilt portion 38T3 and the axial direction is smaller than the angle θ0 between the first tilt portion 34 and the axial direction. The inner diameter of the third inner tilt portion 38T3 is increased from the second side toward the first side.

The fourth inner tilt portion 38T4 is formed as a face tilted to the axial direction as being continued from the third inner tilt portion 38T3. An angle θ4 between the fourth inner tilt portion 38T4 and the axial direction is smaller than the angle θ0 between the first tilt portion 34 and the axial direction. The angle θ4 between the fourth inner tilt portion 38T4 and the axial direction is larger than the angle θ3 between the third inner tilt portion 38T3 and the axial direction. The inner diameter of the fourth inner tilt portion 38T4 is increased from the second side toward the first side.

The fourth inner tilt portion 38T4 is shorter than the third inner tilt portion 38T3. The third inner tilt portion 38T3 and the fourth inner tilt portion 38T4 (examples of the tilt portion) are arranged at the radially outer side of the first outer round portion 33 (an example of the first protruded portion).

Here, the inner circumferential portion 381 of the annular protruded portion 38 is simply required to have an inner diameter at the first side being larger than that at the second side. Here, magnitude relation between the angles of the third inner tilt portion 38T3 and the fourth inner tilt portion 38T4 with respect to the axial direction may be reversed with respect to the abovementioned relation. That is, it is simply required that the angle θ3 between the third inner tilt portion 38T3 and the axial direction is different from the angle θ4 between the fourth inner tilt portion 38T4 and the axial direction.

Next description will be provided on positional relation between the first outer round portion 33 and the annular protruded portion 38 in the second modified example.

The connection portion 38J (a connection position between the fourth inner tilt portion 38T4 and the end part 382 in the second modified example) is formed at the radially outer side of the second imaginary line F2. That is, the end part 382 is arranged at the radially outer side of the first outer round portion 33. Further, the connection portion 38J is formed at the radially outer side of the third imaginary line F3. That is, the end part 382 is arranged at the radially outer side of the first tilt portion 34.

Accordingly, in the second modified example, wear of the piston body 30 is suppressed even when the piston bodies 30 are stacked.

Further, owing to that the third inner tilt portion 38T3 and the fourth inner tilt portion 38T4 are arranged, the piston body 30 of the second modified example is formed into a shape to be easily manufactured.

Third Modified Example

Figure 8:
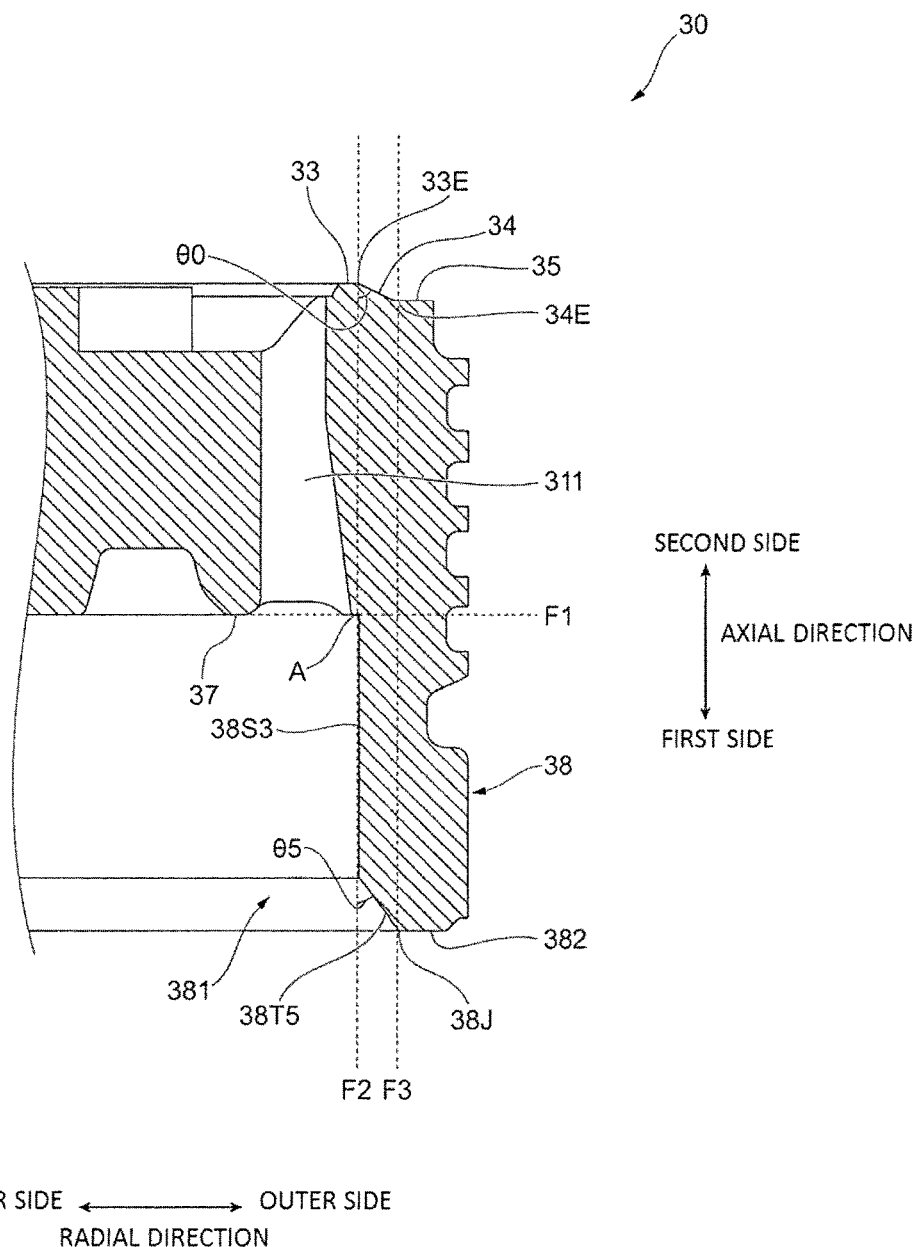
FIG. 8 is a partial sectional view of a piston body of a third modified example.

FIG. 8 is a partial sectional view of the piston body 30 of a third modified example.

In the piston body 30 of the third modified example, the inner circumferential portion 381 has a different shape from that in the abovementioned embodiment. In the following, detailed description will be provided on the shape of the inner circumferential portion 381 of the third modified example.

The inner circumferential portion 381 includes a third linear portion 38S3 and a fifth inner tilt portion 38T5. The third linear portion 38S3 is formed approximately in a straight line shape along the axial direction. A second side end of the third linear portion 38S2 is located at the intersection point A and a first side end thereof is located at a position being closer to the first side than the center of the annular protruded portion 38 in the axial direction.

The fifth inner tilt portion 38T5 is formed as a face tilted to the axial direction. An angle θ5 between the fifth inner tilt portion 38T5 and the axial direction is smaller than the angle θ0 between the first tilt portion 34 and the axial direction. The inner diameter of the fifth inner tilt portion 38T5 is increased from the second side toward the first side. The fifth inner tilt portion 38T5 is shorter than the third linear portion 38S3. The fifth inner tilt portion 38T5 (an example of the tilt portion) is arranged at the radially outer side of the first outer round portion 33 (an example of the first protruded portion).

Next description will be provided on positional relation between the first outer round portion 33 and the annular protruded portion 38.

The connection portion 38J (a connection position between the fifth inner tilt portion 38T5 and the end part 382 in the third modified example) is formed at the radially outer side of the second imaginary line F2. That is, the end part 382 is arranged at the radially outer side of the first outer round portion 33. Further, the connection portion 38J is formed at the radially outer side of the third imaginary line F3. That is, the end part 382 is arranged at the radially outer side of the first tilt portion 34.

Accordingly, in the third modified example, wear of the piston body 30 is suppressed even when the piston bodies 30 are stacked.

Further, owing to that the fifth inner tilt portion 38T5 is arranged, the piston body 30 of the third modified example is formed into a shape to be easily manufactured.

Fourth Modified Example

Figure 9:
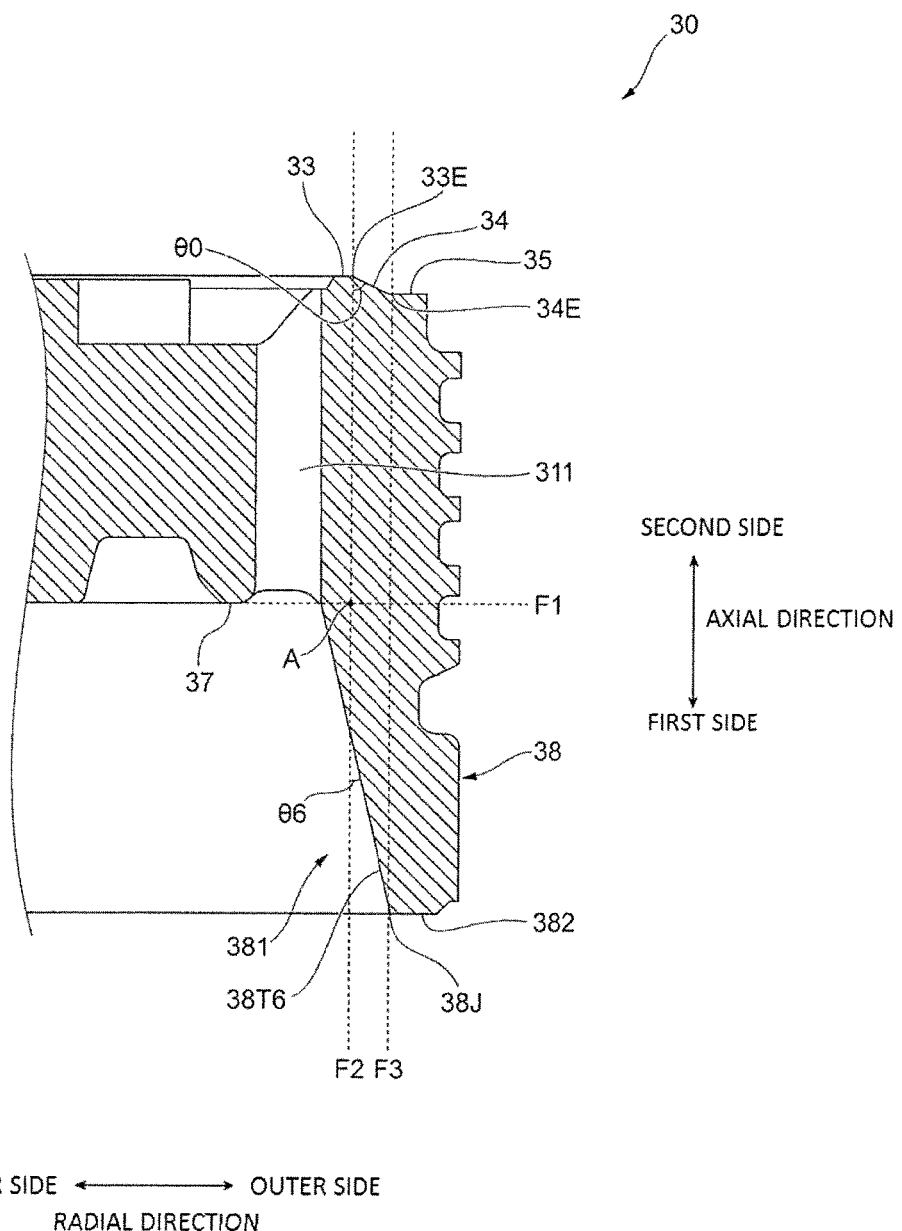
FIG. 9 is a partial sectional view of a piston body of a fourth modified example.

FIG. 9 is a partial sectional view of the piston body 30 of a fourth modified example.

In the piston body 30 of the fourth modified example, the inner circumferential portion 381 has a different shape from that in the abovementioned embodiment. In the following, detailed description will be provided on the shape of the inner circumferential portion 381 of the fourth modified example.

The inner circumferential portion 381 includes a sixth inner tilt portion 38T6. The sixth inner tilt portion 38T6 is formed as a face tilted to the axial direction. An angle θ6 between the sixth inner tilt portion 38T6 and the axial direction is smaller than the angle θ0 between the first tilt portion 34 and the axial direction. The inner diameter of the sixth inner tilt portion 38T6 is increased from the second side toward the first side.

The sixth inner tilt portion 38T6 is formed from a position at the radially inner side of the intersection point A to the end part 382. That is, in the piston body 30, the sixth inner tilt portion 38T6 (an example of the tilt portion) is arranged at a position being aligned with the first outer round portion 33 (an example of the first protruded portion) in the axial direction. The inner circumferential portion 381 of the fourth modified example is formed only of the sixth inner tilt portion 38T6.

Next description will be provided on positional relation between the first outer round portion 33 and the annular protruded portion 38.

The connection portion 38J (a connection position between the sixth inner tilt portion 38T6 and the end part 382 in the fourth modified example) is formed at the radially outer side of the second imaginary line F2. That is, the end part 382 is arranged at the radially outer side of the first outer round portion 33. Further, the connection portion 38J is formed at the radially outer side of the third imaginary line F3. That is, the end part 382 is arranged at the radially outer side of the first tilt portion 34.

Accordingly, in the fourth modified example, wear of the piston body 30 is suppressed even when the piston bodies 30 are stacked.

Further, owing to that the sixth inner tilt portion 38T6 is arranged, the piston body 30 of the fourth modified example is formed into a shape to be easily manufactured.

For example, in the second and third modified examples, similarly to the sixth inner tilt portion 38T6 of the fourth modified example, a part of the inner tilt portion (each of the second to fifth inner tilt portions 38T2, 38T3, 38T4, 38T5) may be located at the radially inner side of the second imaginary line F2. That is, the inner tilt portion (each of the second to fifth inner tilt portions 38T2, 38T3, 38T4, 38T5) may be arranged at a position being aligned with the first outer round portion 33 in the axial direction.

In this case, from a viewpoint to suppress wear of the first outer round portion 33 when the piston bodies 30 are stacked, as described above, the inner tilt portion is simply required to be arranged not to be contacted to the first outer round portion 33.

In the abovementioned embodiment and the first to fourth modified examples thereof, the annular protruded portion 38 is formed into an annular shape. However, not limited thereto, the annular protruded portion 38 may have, for example, a cutout at a part thereof in the circumferential direction. Further, the annular protruded portion 38 may be formed of a plurality of protruded portions discontinuously formed in the circumferential direction.

In the abovementioned embodiment and the first to fourth modified examples thereof, the hydraulic buffer device 1 has a so-called double-cylinder structure. However, not limited thereto, a triple-cylinder structure may be adopted. Further, the structure of the piston portion 100 of the abovementioned embodiment may be adopted instead of the bottom valve portion 60. Further, the structure of the piston portion 100 may be arranged in an accommodation portion, being separated from the first cylinder 11, through which oil flows in accordance with movement of the piston rod 21.

The invention claimed is:

1. A pressure buffer device, comprising:
a cylinder that stores fluid;
a flow path forming portion that forms a flow path through which the fluid flows in accordance with relative movement of a rod with respect to the cylinder in an axial direction of the cylinder; and
an opening-closing portion that opens and closes the flow path of the flow path forming portion, wherein
the flow path forming portion includes:
a first protruded portion that is formed annularly to be protruded in the axial direction, to which the opening-closing portion is contacted; and
a second protruded portion that is protruded in the axial direction toward a side opposite to the first protruded portion, that has an end, a linear portion and a tilt portion,
the end of the second protruded portion is located at a radially outer side of the first protruded portion, the linear portion is formed in a straight line shape along the axial direction, and the tilt portion is tilted with respect to the axial direction and extends from an end of the linear portion.

2. The pressure buffer device according to claim 1, wherein the tilt portion is arranged at the radially outer side of the first protruded portion.

3. The pressure buffer device according to claim 1, wherein the tilt portion includes:
   a first tilt portion; and
   a second tilt portion that is continued from the first tilt portion, and
wherein an angle of the second tilt portion with respect to the axial direction is different from an angle of the first tilt portion with respect to the axial direction.

4. The pressure buffer device according to claim 1, wherein the tilt portion is arranged to be aligned with the first protruded portion in the axial direction.

5. The pressure buffer device according to claim 1, wherein the flow path forming portion includes a third protruded portion that is protruded in the axial direction toward the side opposite to the first protruded portion and is located at a radially inner side of the first protruded portion and the second protruded portion,
the third protruded portion has an end in the axial direction, and
the tilt portion and the linear portion of the second protruded portion are disposed between the end of the second protruded portion and the end of the third protruded portion in the axial direction.

6. The pressure buffer device according to claim 1, wherein the linear portion is located radially outside of the first protruded portion.

7. The pressure buffer device according to claim 1, wherein a radially-outer surface of the flow path is located radially inside of the linear portion.

8. A flow path forming member, comprising:
   a flow path portion through which fluid flows in accordance with relative movement of a rod with respect to a cylinder that stores fluid;
   a first protruded portion that is formed annularly to be protruded in the axial direction, to which an opening-closing portion that opens and closes the flow path is contacted; and
   a second protruded portion that is protruded in the axial direction toward a side opposite to the first protruded portion, that has an end, a linear portion and a tilt portion, wherein
the end of the second protruded portion is located at a radially outer side of the first protruded portion,
the linear portion is formed in a straight line shape along the axial direction, and
the tilt portion is tilted with respect to the axial direction and extends from a lower end of the linear portion.

9. The flow path forming member according to claim 8, further comprising:
   a third protruded portion that is protruded in the axial direction toward the side opposite to the first protruded portion and is located at a radially inner side of the first protruded portion and the second protruded portion, wherein
the third protruded portion has an end in the axial direction, and
the tilt portion and the linear portion of the second protruded portion are disposed between the end of the second protruded portion and the end of the third protruded portion in the axial direction.

10. The flow path forming member according to claim 8, wherein the linear portion is located radially outside of the first protruded portion.

11. The flow path forming member according to claim 8, wherein a radially-outer surface of the flow path is located radially inside of the linear portion.

\* \* \* \* \*